(12) United States Patent
Jain et al.

(10) Patent No.: US 11,892,989 B2
(45) Date of Patent: Feb. 6, 2024

(54) SYSTEM AND METHOD FOR PREDICTIVE STRUCTURING OF ELECTRONIC DATA

(71) Applicant: BANK OF AMERICA CORPORATION, Charlotte, NC (US)

(72) Inventors: Deepak Jain, Haryana (IN); Bhakti Sanjay Gavhane, Maharashtra (IN); Simranjeet Singh Sandhu, Uttar Pradesh (IN); Aditya Sharma, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/705,448

(22) Filed: Mar. 28, 2022

(65) Prior Publication Data

US 2023/0306003 A1    Sep. 28, 2023

(51) Int. Cl.
| | | |
|---|---|---|
| *G06F 16/00* | (2019.01) | |
| *G06F 16/21* | (2019.01) | |
| *G06F 16/2458* | (2019.01) | |
| *G06F 16/25* | (2019.01) | |
| *G06F 16/28* | (2019.01) | |

(52) U.S. Cl.
CPC ........ *G06F 16/213* (2019.01); *G06F 16/2465* (2019.01); *G06F 16/258* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 6,973,459 B1 * | 12/2005 | Yarmus | G06F 16/24544 707/999.102 |
| 8,126,825 B2 | 2/2012 | Guyon | |
| 8,806,451 B2 * | 8/2014 | Zheng | G06F 16/2465 717/136 |
| 9,092,802 B1 | 7/2015 | Akella | |
| 9,324,022 B2 | 4/2016 | Williams, Jr. et al. | |
| 9,646,262 B2 | 5/2017 | Phillipps et al. | |
| 9,858,320 B2 * | 1/2018 | Gkoulalas-Divanis | G06F 16/2465 |
| 9,980,100 B1 | 5/2018 | Charlton et al. | |
| 10,109,017 B2 | 10/2018 | Bothwell et al. | |
| 10,198,460 B2 * | 2/2019 | Gorelik | G06F 16/2465 |
| 10,467,236 B2 * | 11/2019 | Levitan | G06F 16/2465 |
| 10,671,884 B2 | 6/2020 | Walters et al. | |
| 10,957,433 B2 * | 3/2021 | Lucas | G16H 70/00 |
| 11,126,635 B2 | 9/2021 | Behzadi et al. | |
| 11,222,052 B2 | 1/2022 | Hertz et al. | |
| 11,226,975 B2 | 1/2022 | Patthak et al. | |

(Continued)

*Primary Examiner* — Jean M Corrielus
(74) *Attorney, Agent, or Firm* — Moore & Van Allen PLLC; Andrew T. Wood (57) ABSTRACT

Embodiments of the invention are directed to a system, method, or computer program product for an approach to predictive structuring of electronic data. The system uses data mining and data clustering techniques using classification models to organize feature column groups comprising feature columns. The system identifies and flags feature column groups and/or feature columns based on regulatory data standards provided by regulatory bodies. Thereafter, data objects are imported into the system and prediction algorithms are implemented to characterize the feature columns containing the data objects.

15 Claims, 6 Drawing Sheets

(56) References Cited

U.S. PATENT DOCUMENTS

| | | | |
|---|---|---|---|
| 2006/0136462 A1* | 6/2006 | Campos | G06F 16/285 |
| | | | 707/999.102 |
| 2009/0276403 A1* | 11/2009 | Tamayo | G06F 16/2465 |
| 2010/0223276 A1* | 9/2010 | Al-Shameri | G06V 20/13 |
| | | | 707/769 |
| 2016/0224637 A1* | 8/2016 | Sukumar | G06F 16/2465 |
| 2016/0239919 A1 | 8/2016 | Eder | |
| 2017/0091320 A1 | 3/2017 | Psota et al. | |
| 2019/0034734 A1 | 1/2019 | Yen et al. | |
| 2019/0121350 A1 | 4/2019 | Cella et al. | |
| 2019/0303368 A1* | 10/2019 | Liu | G06N 20/00 |
| 2019/0354536 A1* | 11/2019 | Kendrena | G06F 16/2465 |
| 2020/0176098 A1* | 6/2020 | Lucas | G16H 10/60 |
| 2020/0204524 A1* | 6/2020 | Simons | G06F 16/2379 |
| 2020/0272933 A1* | 8/2020 | Zhou | G06F 16/2465 |
| 2020/0311608 A1 | 10/2020 | Xu et al. | |
| 2021/0034581 A1* | 2/2021 | Boven | G06F 16/212 |
| 2021/0217001 A1* | 7/2021 | Harrison | G06F 21/6218 |
| 2021/0314364 A1* | 10/2021 | Brannon | G06N 20/00 |
| 2021/0336996 A1* | 10/2021 | Brannon | G06F 21/552 |
| 2022/0058519 A1* | 2/2022 | Kelton | G06N 20/00 |
| 2022/0067185 A1* | 3/2022 | Chikoti | G06F 16/35 |

\* cited by examiner

SYSTEM AND METHOD FOR PREDICTIVE STRUCTURING OF ELECTRONIC DATA

BACKGROUND

Currently, in data warehouse environments, manual intervention and oversight is necessary when new data is introduced to the warehouse environment. Oftentimes, data is introduced in a complex form and is used across multiple platforms, and as such it requires consistency in data architectural format in order for the data to be maintained and useful. There currently exists no automated solution to predict technical design component structuring for data. As such, there exists a need for a system and method for predictive structuring of electronic data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for predictive structuring of electronic data.

Currently, entities have data warehouse environments which comprise data which is structured in a format for utilization within the entity and across numerous platforms across the entity. As such, new data which is to be added to the entity system must undergo lengthy manual structuring via data architects who are familiar with the data warehouse environments and the method of structuring data therein. This is so that data may be built with consistent and integrated architecture. Moreover, this new data may be subject to numerous security policies which protect and secure sensitive data, so an architect may have to manually account for such policies when structuring the data.

The system disclosed herein implements a method for predictively structuring electronic data which predicts technical design components using an intelligent method. The system receives both new data for which the model is to be predicted, metadata of previously stored entity data tables, and regulatory standards provided by regulators. The system then utilizes metadata to form various groupings ("feature column groups") of the best-suited data columns ("feature columns") for each feature grouping. Regulatory standards documentation is used to identify sensitive data groupings and regulatory requirements thereof, and in some embodiments form a separate grouping or feature column for such data. Thereafter, the system uses metadata and new data to complete the feature columns to closely match the structure of similar data previously stored in the system, and predict the name, type, and length of data of each column using only the data objects therein. The new structure is output with the feature columns identified and organized in feature column groups, and in some embodiments the output is structures as a pdf, doc, docx, jpeg, Visio file, or the like.

Embodiments of the invention are directed to a system, method, or computer program product for predictive structuring of electronic data, the invention comprising receiving entity data tables, wherein the entity data tables comprise data objects stored in a memory device of an entity system, receiving regulatory data, wherein the regulatory data comprise regulatory standard documentation and wherein the regulatory standard documentation provides data sensitivity standards in text, mining metadata from the entity data tables and mining data sensitivity standards from the regulatory data, performing clustering on mined data, wherein the mined data comprises the mined data sensitivity standards and the mined metadata, and wherein the clustering implements a classification model to determine a grouping of the mined data such as to prepare for one or more feature columns to be placed into feature column groups, the feature column groups comprising one or more feature columns wherein each of the feature columns in a feature column group is determined by the classification model to be related to other feature columns within the feature column group and identifying the one or more feature columns or the feature column groups based on data type and sensitivity.

In some embodiments, or in combination with the previous embodiment, the system, method, or computer program product further comprises importing data objects, creating a prediction model using the data objects, wherein the one or more feature columns are predicted based on the data objects in the one or more feature columns, repetitiously subjecting the data objects to the prediction model to determine characteristics of the one or more feature columns within each feature column group, and flagging the one or more feature columns or the feature column groups based on the data type and the sensitivity.

In some embodiments, or in combination with any of the previous embodiments, the system, method, or computer program product further comprises assigning a related target key to data objects extending across multiple feature column groups, storing the related target key in a relationship key table, appending the relationship key table to each of the feature column groups, and outputting predictively structured data in one or more visual formats.

In some embodiments, or in combination with any of the previous embodiments, performing clustering on the mined entity data tables is performed iteratively, and wherein the classification model is a K-means algorithm.

In some embodiments, or in combination with any of the previous embodiments, determining by the classification model to be related to the other feature columns within the feature column group comprises classifying each of the feature columns based on the metadata and data sensitivity standards of the data objects within each of the feature columns.

In some embodiments, or in combination with any of the previous embodiments, the prediction model further comprises classifying and identifying the data objects or the one or more feature columns as numeric or non-numeric, and wherein a Naïve Bayes algorithm is used for non-numeric, and a decision tree algorithm is used for numeric.

In some embodiments, or in combination with any of the previous embodiments, determining the characteristics of the one or more feature columns comprises determining at least one of type, length, name of feature, or regulatory sensitivity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Embodiments of the invention are directed to a system, method, or computer program product for an approach to predictive structuring of electronic data. The system uses data mining and data clustering techniques using classification models to organize feature column groups comprising feature columns. The system identifies and flags feature column groups and/or feature columns based on regulatory data standards provided by regulatory bodies. Thereafter, data objects are imported into the system and prediction algorithms are implemented to characterize the feature columns containing the data objects.

In accordance with embodiments of the invention, the term "entity" may be used to include any organization or collection of users that may interact with a network. An entity may refer to a business, company, or other organization that either maintains or operates the system or requests use and accesses the system. "Entity" may be used to include any organization that processes financial transactions including, but not limited to, banks, credit unions, savings and loan associations, investment companies, stock brokerages, resource management firms, insurance companies or the like.

A "user" as used herein may refer to any entity or individual associated with the system. In some embodiments, a user may be a computing device user, a phone user, a mobile device application user, a financial institution customer (e.g., an account holder or a person who has an account (e.g., banking account, credit account, or the like)), a system operator, database manager, a support technician, and/or employee of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, laptop computers, cameras, video recorders, audio/video player, radio, global positioning system (GPS) devices, or any combination of the aforementioned. In some embodiments, a device may refer to an entity's computer system, platform, servers, databases, networked devices, or the like. The device may be used by the user to access the system directly or through an application, online portal, internet browser, virtual private network, or other connection channel. The device may be a computer device within a network of connected computer devices that share one or more network storage locations.

As used herein, the term "prediction model" may refer to an algorithm as part of machine learning with artificial intelligence built using data of a system to make decisions or predictions without the need of being discretely programmed to make decisions or predictions. Machine learning may implement numerous approaches such as supervised learning, unsupervised learning, reinforcement learning, or the like, in order to convert mined data into the machine learning algorithm. Various prediction models may be created and implemented, such as artificial neural networks, decision trees, Naïve Bayes algorithms, support-vector machines, regression analysis, training models, Bayesian networks, federated learning, or the like.

As used herein, the term "classification model" may refer to a machine learning classification technique or clustering algorithm which uses an algorithm to receive input data and parameters to determine an output/prediction of classification, such as K-means. Data is received and classified or "clustered" into a class membership based on the target number k of centroids desired or targeted from the data. For example, if the target number k=3, data is plotted along a graph, and the algorithm determines 3 centroids (representing the center of a cluster) based on the data wherein each datapoint is provided to each of the clusters through reducing the sum of squares of the in-cluster. Expressed another way, the K-means algorithm allocates each of the points of data to the nearest cluster, while also aiming to keep the centroids as small as possible. At first, the centroids may be randomly selected to begin the clustering, whereinafter calculations are conducted iteratively to optimize the location and/or size of the centroid. Once a predetermined number of iterations has been complete, the clustering is stopped. In other embodiments, the clustering may be stopped once the centroid has been stabilized and there are no changes to the values of the centroids.

As used herein, the term "machine learning platform" may refer to any software or software-implemented method which is configured to train, build, and deploy machine learning models, prediction models, classification models, algorithms, and/or machine learning operations ("MLOps"). The machine learning platform may generate machine learning models, orchestrate and deploy machine learning models, and also conduct health, diagnostic, and/or metrics calculations to reduce problems associated with ongoing use of machine learning in an entity.

As used herein, the term "data" may refer to any number of data received, collected, stored, or otherwise in possession of an entity. This data may be comprised of transactional records, personal identification indicators, contact information, card numbers, ledger balances, account numbers, or the like. It shall be appreciated that some data may have specialized sensitivity requirements and/or may be subjected to regulatory oversight. As such the entity may want to protect the data in a specialized way, or monitor/handle the data in a certain way, or the like. As will be explained herein, the system is capable of denoting such data as being sensitive and thereafter marking the location of such data with specialized indicators.

As used herein, the term "data table" refers to a view of data displayed on a graphical user interface of a user device for organizing and manipulating large datasets using table. The data table may appear as a spreadsheet with rows and columns of data, each data in a row sharing a common characteristic, and each data in a column sharing a common characteristic. An underlying function reads input data from a data file such as comma separated value (".csv") and automatically detects headers, column types, rules, files, URLs, shells, raw text, or the like, and output the two-dimensional data table for ease of manipulation. An "entity data table" is a data table which was created and stored by the entity at a previous time.

As used herein, the term "data object" refers to data which is received by the entity or user associated with the entity, these data objects not structured to the structure or architecture desired by the entity for acquiescing with the entity's data warehouse. In this way, the invention herein is predominantly configured to intelligently structure the data objects to conform with a previously determined architecture for implementation into the data warehouse environment.

Figure 1:
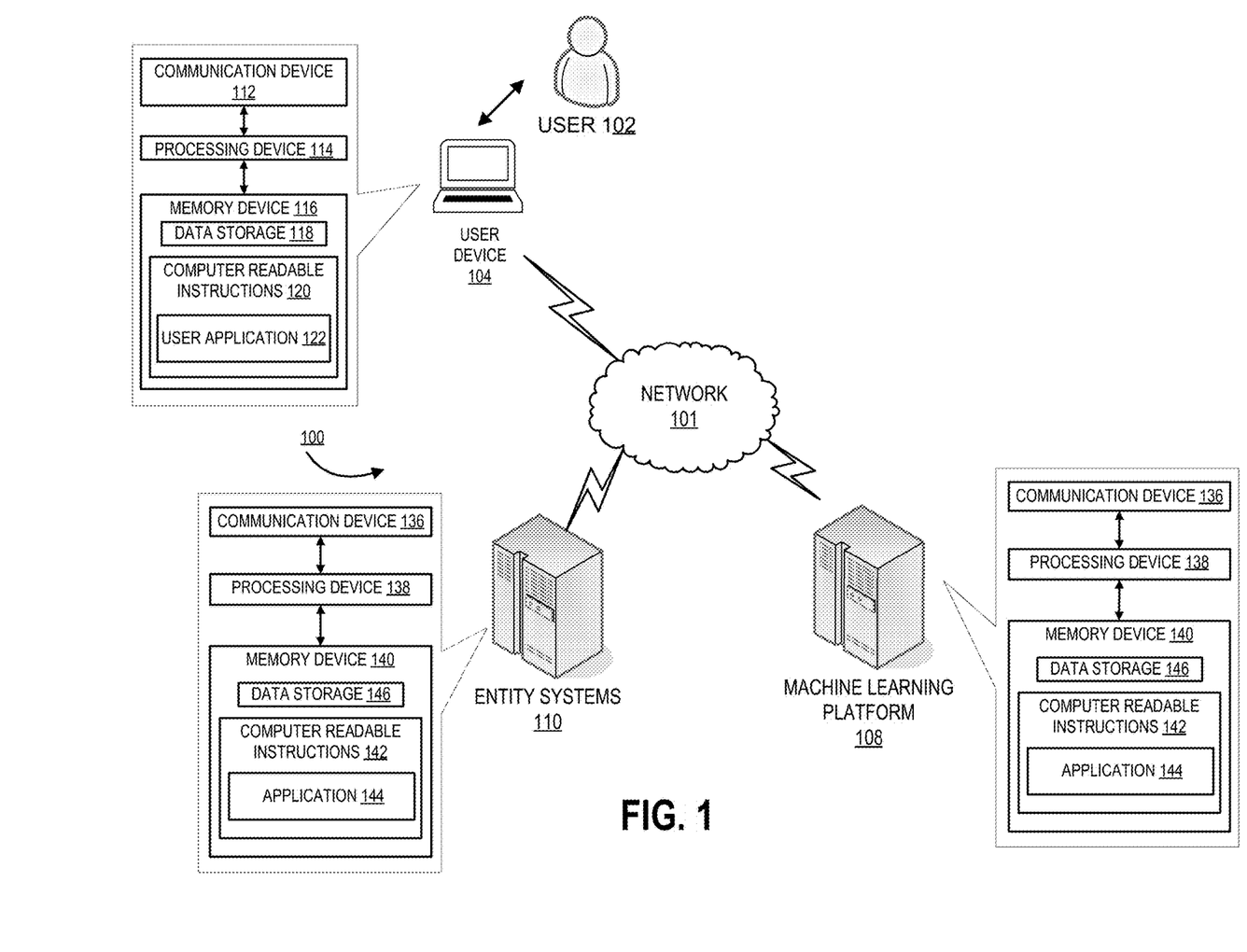
FIG. 1 illustrates a network environment in which the processes described herein are implemented, in accordance with some embodiments of the present invention.

FIG. 1 illustrates an environment 100 for the system that includes specialized systems and devices communicably linked across a network to perform a method for predictive structuring of electronic data.

As illustrated in FIG. 1, the entity systems 110 is operatively coupled, via a network 101 to the user device 104, and to the machine learning platform 108. In this way, entity systems 110 can send information to and receive information from the user device 104 and machine learning platform 108. It shall be noted that in some embodiments of the invention, machine learning platform 108 is merely a system along entity systems 110, and as such entity systems 110 may comprise machine learning platform 108. FIG. 1 illustrates only one example of the system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network.

In some embodiments, the user 102 is an individual associated with an entity who has the ability and/or authority to access entity systems 110, machine learning platform 108, or the like. Those skilled in the art will appreciate that at least some example embodiments contemplate multiple such users. In some embodiments, the user 102 has a user device, such as a mobile phone, tabled, computer or the like. FIG. 1 also illustrates a user device 104. The user device 104 may be any communication device such as a smart phone, a telephone, a tablet, a computer, or the like, but is preferably a computing device or terminal. User device 104 can perform computing functions, and the device may be used by the user to access the system and/or network 101 directly or through an application, online portal, internet browser, virtual private network, or other connection channel. The device may be a computer device within a network of connected computer devices that share one or more network storage locations.

The user device 104 generally comprises a communication device 112, a processing device 114, and a memory device 116. The processing device 114 is operatively coupled to the communication device 112 and the memory device 116. The processing device 114 uses the communication device 112 to communicate with the network 101 and other devices on the network 101, such as, but not limited to the entity systems 110 and machine learning platform 108. As such, the communication device 112 generally comprises a modem, server, or other device for communicating with other devices on the network 101.

As further illustrated in FIG. 1, the user device 104 comprises computer-readable instructions 120 stored in the memory device 116, which in one embodiment includes the computer-readable instructions 120 of a user application 122 and data storage 118. A user device 104 is preferably a personal computing device or terminal, but it may be any communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, voice assistants, laptop computers, cameras, video recorders, audio/video player, radio, GPS devices, any combination of the aforementioned, or the like. Although only one user device 104 is depicted in FIG. 1, the system environment 100 may comprise a plurality of user devices 104. In some embodiments of the invention described herein, a plurality of user devices 104 is used. In other embodiments, user devices 104 are not necessary for the functionality of the system and may not be integrated into the system in any appreciable manner.

As illustrated in FIG. 1, the entity systems 110 generally comprises a communication device 136, a processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the machine learning platform 108 and the user device 104. As such, the communication device 136 generally comprises a modem, server, or other device for communicating with other devices on the network 101.

As further illustrated in FIG. 1, the entity systems 110 comprises computer-readable instructions 142 stored in the memory device 140, which in one embodiment includes the computer-readable instructions 142 of an application 144. In some embodiments, memory device 140 includes data storage 146 for storing data related to the system environment, but not limited to data created and/or used by the application 144.

Embodiments of the entity systems 110 may include multiple systems, servers, computers or the like maintained by one or many entities. FIG. 1 merely illustrates one of those systems. In one embodiment of the invention, the entity systems 110 is operated by a second entity that is a different or separate entity from the machine learning platform 108. In some embodiments, the machine learning platform 108 may be part of the entity systems 110. Similarly, in some embodiments, the entity systems 110 is part of the machine learning platform 108.

In one non-limiting example of the entity systems 110 the memory device 140 stores an application 144. In one embodiment of the invention, the application 144 may comprise computer executable program code that instructs the processing device 138 to operate the communication device 136 to perform certain communication functions described herein. In one embodiment, the computer-executable program code of an application associated with the network and application 144 may also instruct the processing device 138 to perform certain logic, data processing, and data storage functions of the application.

The processing device 138 is configured to use the communication device 136 to gather data, such as data corresponding to data flows, data flow steps, inputs from a user in terms of interdependency of each data flow step, key output metrics defined by a user, characteristics of data flow steps such as current cycle time, touch time, rework time, wait time, or the like. The processing device 138 stores the data that it receives in its memory device 140.

Machine learning platform 108 is operatively coupled to entity systems 110, user device 104, and/or each other through network 101. Machine learning platform 108 has systems with devices the same or similar to devices described for entity systems 110 and/or user device 104 (i.e., communication device, processing device, memory device). Therefore, machine learning platform 108 communicates with user device 104, and/or with entity systems 110 in the same or similar way as previously described with respect to each system.

As such, machine learning platform 108 generally comprises a communication device, at least one processing device, and a memory device. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device is operatively coupled to the communication device and the memory device. The processing device uses the communication device to communicate with the network 101 and other devices on the network 101. As such, the communication device generally comprises a modem, server, wireless transmitters or other devices for communicating with devices on the network 101. The memory device typically comprises a non-transitory computer readable storage medium, comprising computer readable/executable instructions/code, such as the computer-readable instructions, as described below.

As further illustrated in FIG. 1, machine learning platform 108 comprises computer-readable instructions or computer readable program code stored in the memory device. The computer readable instructions, when executed by the processing device 138 are configured to cause the processing device to perform one or more steps described in this disclosure.

It is understood that the servers, systems, and devices described herein illustrate one embodiment of the invention. It is further understood that one or more of the servers, systems, and devices can be combined in other embodiments and still function in the same or similar way as the embodiments described herein.

Figure 2:
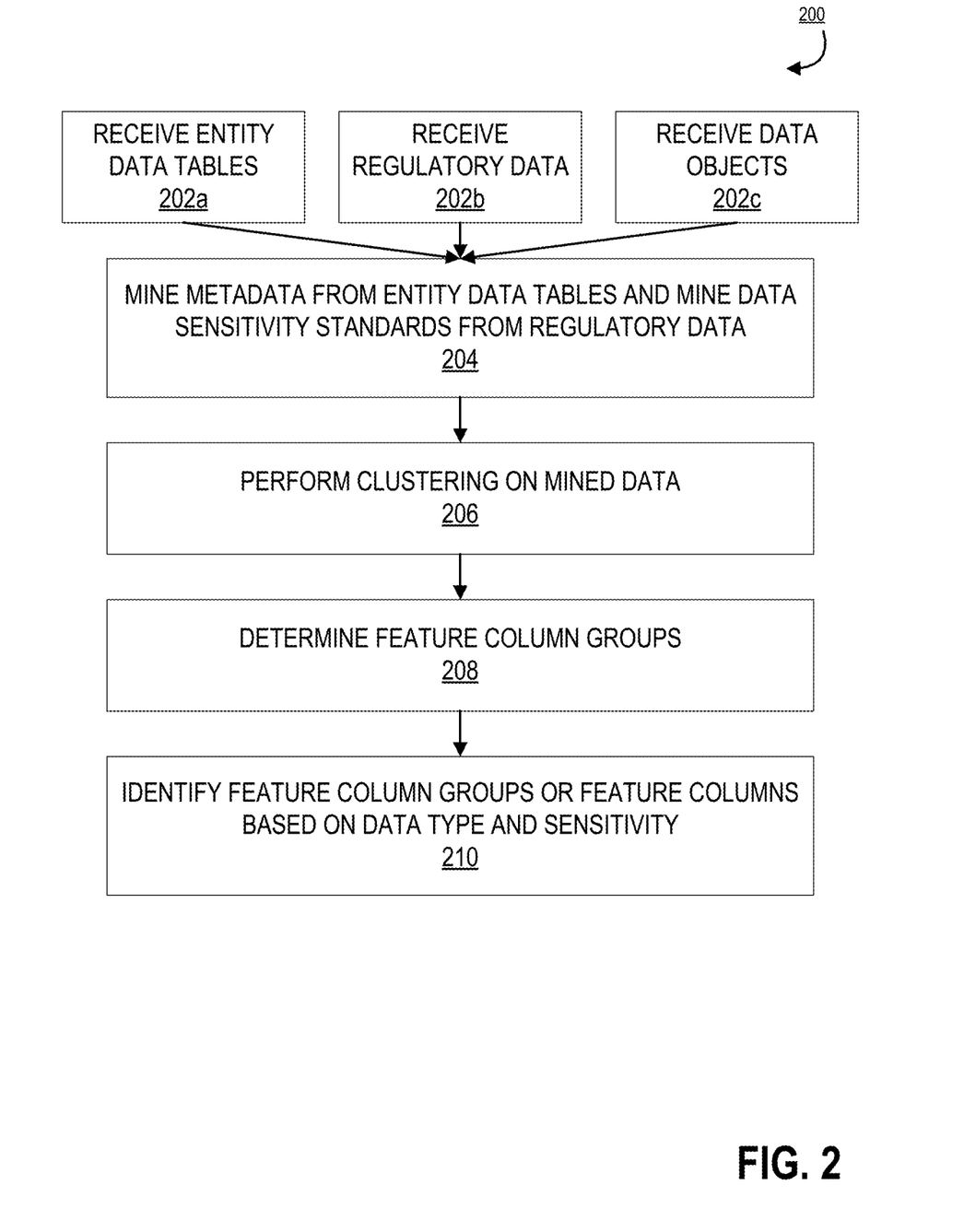
FIG. 2 illustrates a block diagram of a process for identifying feature column groups based on data type and sensitivity.

FIG. 2 illustrates a block diagram 200 of a process for identifying feature column groups based on data type and sensitivity. The process begins by receiving entity data tables as illustrated in block 202a, regulatory data as illustrated in block 202b, and data objects illustrated in block 202c. It shall be understood that the present invention operates via a computer system, typically at least initiated by a user associated with an entity, such as a data analyst, data architect, project manager, engineer, or the like. Although it may be initiated by such a user associated with an entity, the system is configured to operate without human intervention thereafter. A user associated with an entity may initiate on the graphical user interface of a user device, such as a personal computer, server, or the like. Entities generally comprise data warehouses, wherein a large amount of data is held in a repository for use throughout the entity. One of the challenges associated with such data warehouses is that the data should be organized using an architecture to allow for consistency and ease of use, while also being integrated throughout the entity systems. When a new data domain feed or set of data objects is introduced to the entity systems, it must be organized in a fashion consistent with existing entity data tables. Typically, this may involve a large amount of manual work on behalf of the entity.

In any case, the process of predictive structuring first requires entity data tables to be received by the system, as illustrated by block 202a. These entity data tables are located within a data warehouse and may be comprised of metadata, which is information about the data such as descriptive metadata (e.g., title, keywords, etc.), structural metadata (e.g., relationships between data objects, etc.), administrative metadata (e.g., resource type, permissions, etc.), reference metadata (e.g., quality and contents, etc.), statistical metadata (e.g., processes that produce or collect data objects, etc.), or the like.

The system also, while not required but beneficial, receives regulatory data, as shown in block 202*b*. This regulatory data comprises regulatory standard documentation that provides data sensitivity standards in text format. In certain industries, the handling of sensitive data must adhere to standards set forth by regulatory organizations, governments, or the like. These organizations typically release regulatory standards documentation associated with best practices and/or guidelines for compliance to the regulatory standards. Each of these documentation documents may comprise rules, statutes, guidelines, categories of data for which it applies, or the like in a computer file format such as .pdf which may be extracted for implementation with the present system. In other embodiments, the documentation documents may be provided in text or graphical format. As such, the system is agnostic as to the type of file received and parses the file for keywords associated with the data sensitivity standards. It is important for an entity to process such documentation so that adherence to these principles is assured. The system described herein makes use of keywords found as a result of parsing the standards documentation in order to determine which relevant data objects are subjected to such standards. The system also receives data objects, as illustrated by block 202*c*. Although the methods illustrated in FIG. 1 are in preparation for structuring of the data objects, in some embodiments a user associated with an entity may use data objects for reference prior to structuring of the data objects, and as such are illustrated as an input in FIG. 1.

In block 204, the system process continues by mining metadata from entity data tables and mining data sensitivity standards from regulatory data. The data sensitivity standards are mined from the regulatory data, as previously described. The system mines the data sensitivity standards from such documents, such as by parsing the document for keywords. Examples of regulatory organizations which put forth regulatory data are FFIEC, FDIC, OCC, CFPB, FRB, HIPAA, or the like, many of which are put forth by government entities. In some cases, however, these regulatory data may be provided as internal regulatory documents created and maintained by entities for use as regulatory standards within the entity alone.

Likewise, metadata is mined from entity data tables. Metadata may contain any number of information relating to the entity data tables, as previously described, such as descriptive metadata (e.g., title, keywords, etc.), structural metadata (e.g., relationships between data objects, etc.), administrative metadata (e.g., resource type, permissions, etc.), reference metadata (e.g., quality and contents, etc.), statistical metadata (e.g., processes that produce or collect data objects, etc.), or the like.

Once the metadata and data sensitivity standards are mined from the entity data tables and regulatory data, block 206 continues by performing clustering on the mined data (e.g. the data mined from the entity data tables and regulatory data) using a classification model. As previously mentioned, clustering involves the use of a classification model, preferably a K-means algorithm to recognize existing patterns in the mined data. Although a K-means algorithm is preferable, it shall be understood that other classification models such as ZeroR, OneR, Naïve Bayesian, Decision Tree, Logistic Regression, Artificial Neural Network, Support Vector Machine, K-Nearest-Neighbor, or the like may be used to achieve similar results. The K-means algorithm analyzes each of the mined data and determines based on the metadata, keywords, values of the data objects, and so forth, for which mined data are closely related. For example, the k variable may be twenty, and as such the K-means algorithm may cluster the mined data into a twenty groups.

Ultimately, the purpose of performing clustering using a classification model is to determine which mined data share common characteristics and/or are commonly grouped together in the entity data tables in order to classify and aid in distributing "feature columns" of other data into individual groups known as "feature column groups" at a future time, such that all of the feature columns in a feature column group are related and may be grouped together in a feature column group and treated similar to the other feature columns within the feature column group. A feature column is an organized column of data objects which are associated with the feature column group. For example, one feature column may be for "name", wherein a data object that is determined to be a name is placed into said feature column. The contents of a feature column for "name" (e.g., names of individuals) may be determined by the classification model to be closely associated with addresses, thus a feature column for "address" will be grouped within the same feature column group as "name". Feature column groups will be structured in such a way as to convey a table, comprising columns and rows, with columns indicated by descriptive headers known herein as "feature columns", and each row being associated with a common factor such as an individual user (e.g., a customer of the entity). Data objects are stored in the cells at the intersection of any given column and row, the data objects comprising text, numbers, descriptors, colors, or the like.

As such, block 208 illustrates the output of clustering to determine potential feature column groups, as previously noted. While the actual feature column groups are not formed in block 208, the system, as an output, has recognized and learned which feature columns could be associated with one another for use in the processes described herein.

In block 210, the system identifies potential the one or more feature columns or the feature column groups based on data type and sensitivity. As previously described, the feature column groups comprise feature columns which share common characteristics. The system is configured to identify these groups based on the clustering performed by the classification model. In this way, the system is able to recognize, name, describe, or delineate each of these groups from each other in preparation for each of the groups to be treated based on the contents of the group, such as for sensitivity based on the data sensitivity standards.

Figure 3:
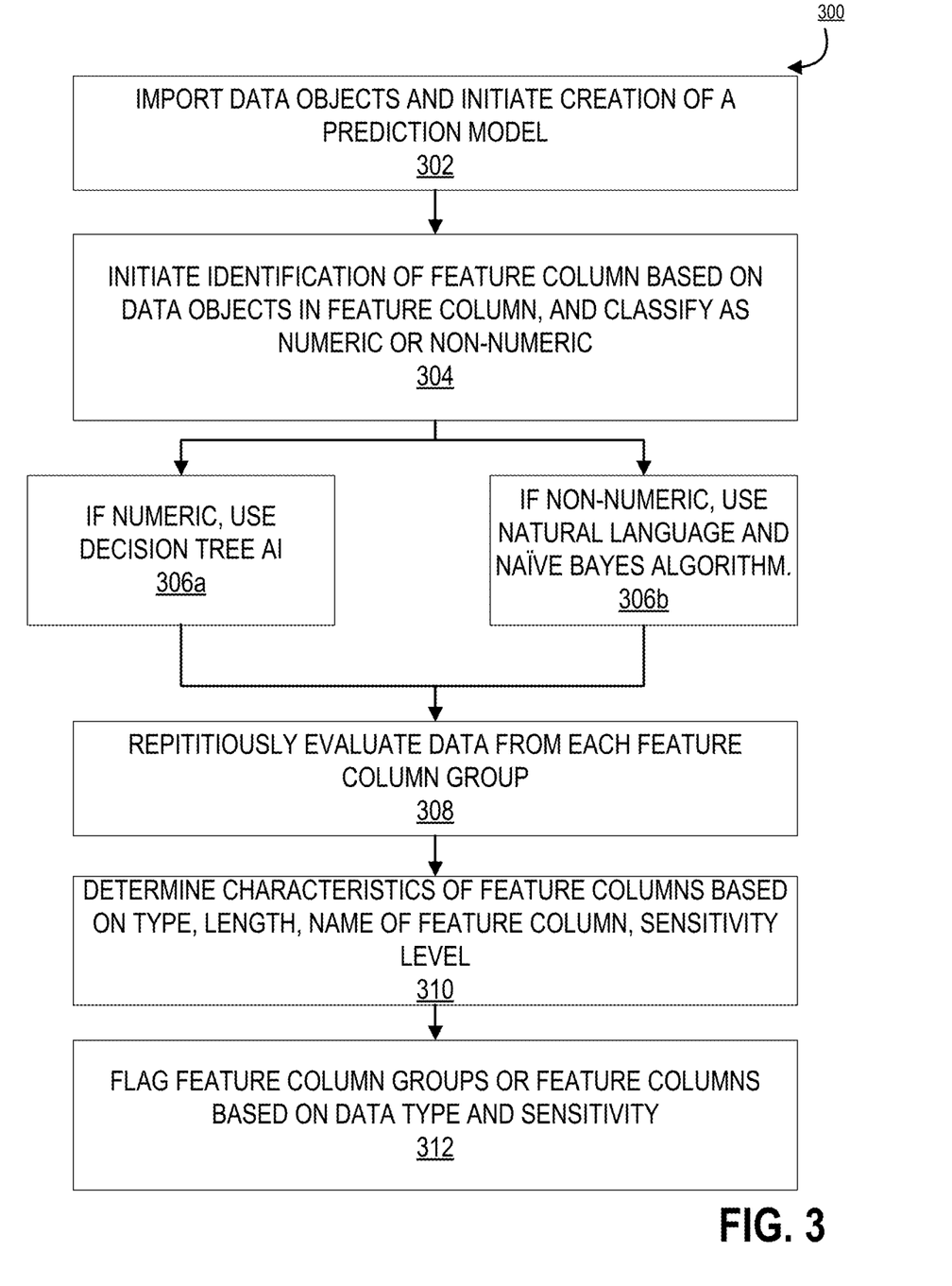
FIG. 3 illustrates a block diagram of a process for predictive structuring of electronic data.

FIG. 3 illustrates a block diagram 300 of a process for predictive structuring of electronic data. The process begins in block 302 by importing data objects and initiating the creation of prediction model. A prediction model, if created properly, will allow an entity to receive a set of unknown data objects and, through artificial intelligence or machine learning, predict the feature column in which the data object(s) is stored. For example, a feature column may contain a data object comprising a ten digit numerical value with dashes ("-") after the third and sixth digits, and as such the system will recognize this feature column to be telephone numbers. To accomplish this, the prediction model may be trained using data objects with known feature column group(s) and/or feature column(s) associated with the data objects. As such, the importation of the data objects may occur as to provide the system with this data to train the model.

It shall be understood that feature column groups are generally comprised of one or more feature columns with a known relationship or similarity. For example, name, address, and contact number may have been previously determined by the classification model to be related and therefore these feature columns may be placed into a feature column group for personal information. Furthermore, social security numbers and similar information may be placed into a separate feature column group with special treatments as containing sensitive information as dictated by the data sensitivity standards previously mined from the regulatory data.

In block 304, the process continues by initiating identification of feature column(s) based on data objects within the feature column and classifying as numeric or non-numeric. For example, a particular feature column as determined by the prediction model may only contain numeric data objects, such as account balance, phone number, account number, or the like. As such, the system recognizes this fact and proactively identifies it as such. Similarly, the data objects, feature columns, or feature column groups may be classified an identified as being non-numeric, such that the data objects therein are primarily text-based inputs, such as name, street name, country of citizenship, or the like. As such, the system recognizes this fact and proactively identifies it as such.

Blocks 306a, 306b represent the portions of the process in which a prediction is made for the name and and/or type of feature column (e.g. the name of the feature column, such as "First Name," "Address," "Phone Number," "Account Number," and so forth) based on whether the data object(s) within the feature column are comprised of numeric or non-numeric characters. The system is configured to use feature columns stored in the entity systems from prior entry of data objects in order to make a determination of the name and/or type of feature column of which to which the data objects presented to the system herein are inserted. The type of algorithm used in making this determination is dependent on the contents of the data object(s) within the column, specifically whether the data object(s) contains numeric characters or non-numeric characters. In the instance where numeric, a decision tree AI algorithm is used as shown in block 306a. In the instance where non-numeric characters are used, a natural language processing AI algorithm is used as shown in block 306b.

In block 306a, although the fact that the data object(s) have been identified as containing numeric characters is useful, the system must still determine, or at least accurately predict, the nature of the feature column of which the data object belongs. Continuing with the previous example, the system must decipher whether the feature column contains data objects comprising account balances, or whether it contains phone numbers, etc. To do this, a decision tree algorithm is utilized. A decision tree algorithm is one type of classification model which builds classification models in a tree structure, such that "decision nodes" each comprise multiple branches, with a corresponding "leaf node" representing a classification as a result of how any given data object falls within the multiple decision nodes. For example, the system may query the data objects to determine whether there is a decimal. As such, the decision nodes, representing "yes" and "no" may be traversed by the system depending on the finding of the query, and thereafter determine that if the data objects comprise decimals, the feature column likely contains account balances. The decision tree algorithm traverses existing data objects and feature columns stored within the entity systems to be able to make such predictions.

In block 306b, the nature of a feature column to which a non-numeric data object belongs may be determined first by using a natural language library such as "nltk", where natural human language in any number of spoken languages such as English, Spanish, French, or the like, are processed in a manner such that computers can learn from such language and analyze words, phrases, sentences as presented to the computer in the non-numeric data objects. Thereafter, a Naïve Bayes algorithm is applied to the word(s) in the data object(s). A Naïve Bayesian classifier constructs classifications based on the assumption that features used to determine classification are all independent of one another, and as such the value given to each feature as a weighting factor in classification is independent to the values given to other features. For example, a vegetable may be considered a carrot if it is orange, conical, and about 4 cm in diameter. A Naïve Bayes classifier would look at how each of the factors of color, shape, and diameter contribute to the likelihood that the vegetable is a carrot, regardless of any correlations between diameter, shape, and color. In the present invention the Naïve Bayes classifier may look at a string of text such as "Street Address A" and consider the contribution of the street name to the likelihood that it is a street address, followed by the designation of the type of street such as "St.", "Dr.", "Rd.", and so forth. It may then use the data objects and feature columns thereof stored within the entity systems to make a prediction regarding the name/attributes of the feature column to which the data object(s) belong.

The process continues in block 308, where data objects are repetitiously evaluated from each feature column group. Although the process up to block 308 typically results in a great amount of accuracy, the confidence intervals in each of the predictions are able to be improved by iteratively and repetitiously performing the classification process outlined in blocks 302, 304, 306a, and 306b, such that each of the lists of data objects within a given feature column is reevaluated multiple times to determine the effectiveness of the original prediction, change the prediction to the newly predicted feature column, and/or to ensure that proper classification of feature column was given to the data object(s).

Block 310 continues the process by determining the characteristics of the feature columns based on, at least: type, length, name of feature column, and sensitivity level. Based on the prediction model's output, the system can reasonably make an assumption about the type of feature column, (e.g. text, numerical, binary, or the like), the length of the column (e.g. number of characters of input in each data object, or the like), name of the feature column (e.g. "Street address," "Account number," or the like), and sensitivity level (e.g. highly sensitive, sensitive, not sensitive, or the like).

The process continues by flagging column groups based on data type and sensitivity as illustrated in block 312. Previously in block 210, the feature column groups were identified based on data type and sensitivity. By applying the sensitivity identification as previously determined (through grouping) to the feature column groups as described in block 312, the data objects contained within the feature columns and/or feature column groups can be treated such as to comply with the requirements of the regulatory data. Flagging, such as applying a marker or indicator of the sensitive nature of the feature column group(s) is beneficial to the data warehouse environment by ensuring that future data objects are handled in a manner which is in compliance with the requirements of the regulatory data. So, for example, a feature column group wherein all of the data objects within it are contains a user or account holder's personal information, the feature column group may be subsequently flagged and containing sensitive information per the regulatory data, and thereafter be treated with additional security measures such as encrypting the data object, using only secure means to transfer the data object, using an alternate data retention policy, or the like. It shall also be understood that flagging based on the data type and sensitivity may also be applied only to the feature columns, and not to the feature column groups themselves, such that an array of data types and sensitivity flags all cohabitate within the same feature column group.

The system may use a standardized scale for various flags across all feature columns and feature column groups, such that one particular flag color, shape, size, pattern, etc. visually represents to users associated with the entity the type of data objects contained therein, as well as the appropriate level of sensitivity required when handling such data objects. The standardized scale may be held within a flag table to provide quick reference and lookup capabilities in circumstances where a user associated with an entity needs to determine the meaning of a flag, given only the physical appearance of the flag (color, shape, size, and so forth).

Figure 4:
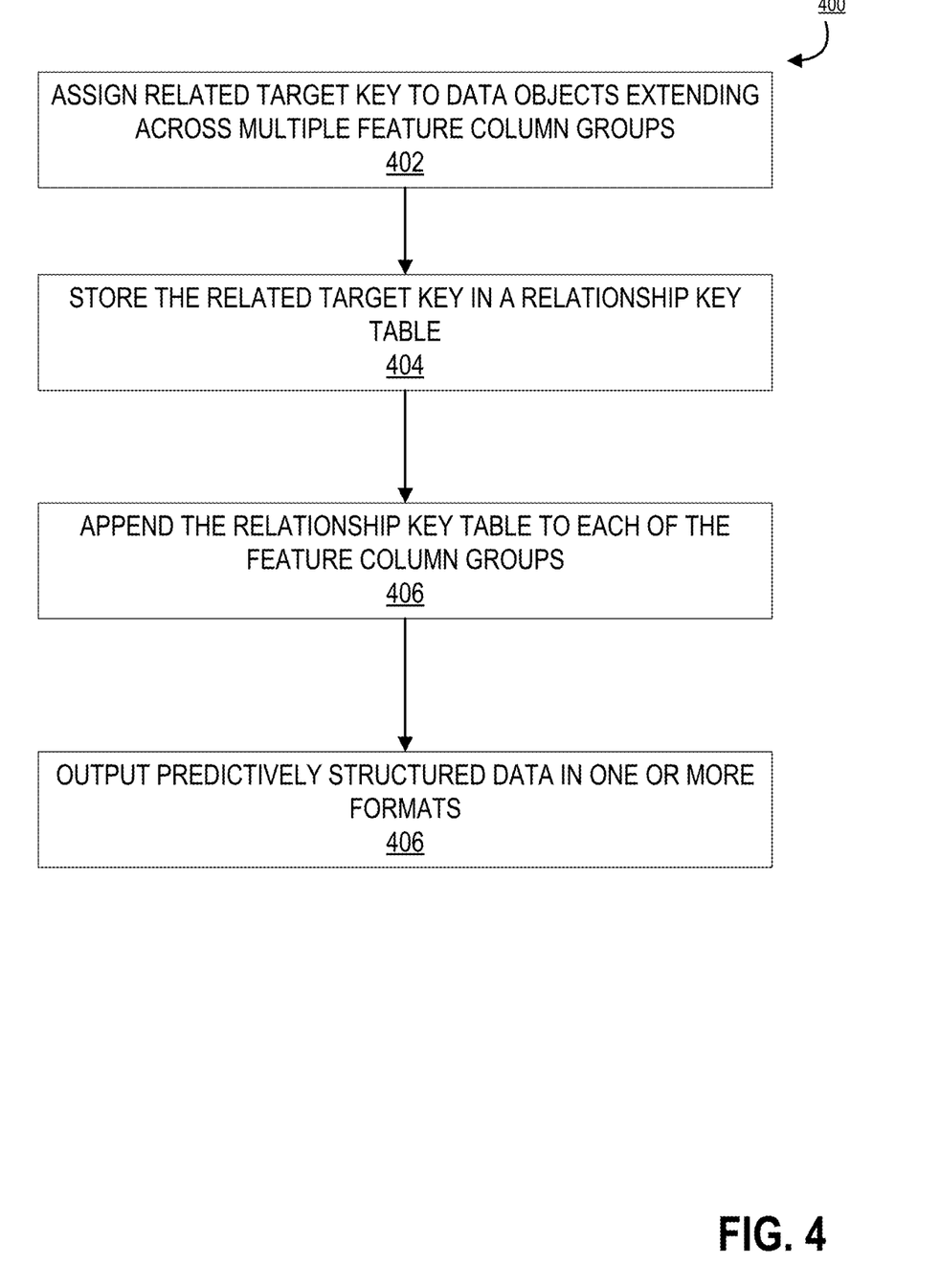
FIG. 4 illustrates a block diagram of assigning related target keys and appending a relationship key table.

FIG. 4 illustrates a block diagram 400 of a method for assigning related target keys and appending a relationship key table. The process begins as illustrated by block 402 by assigning a related target key to data objects extending across multiple feature column groups. In many instances, a particular set of data objects may be associated with a singular user, for example an account number, a phone number, and a street address. However, as previously described, each of these data objects may be held within separate feature column groups (and therefore, feature columns) since each data object may have different descriptors, sensitivity requirements, or the like. In some embodiments, multiple data objects associated with a user may be held in a singular feature column group, while one or several other data objects associated with the user are held in a separate feature column group.

In the circumstances outlined above, the system benefits from having the ability to maintain an association between the data objects associated with a user across all of the feature column groups. This provides a way for the system to retrieve all data objects for a user by having a reference and link to all of the data objects associated with the user at any given time. As such, a related target key is assigned to data objects individually, wherein the related target key is a unique identifier used for all of the data objects associated with a particular user. It shall be understood, however, that related target keys may also be assigned and deployed in any other manner which facilities groupings of data objects which share a common characteristic, such as user device used to create such a data object, location, and so forth.

An entity comprises a plurality of users which may each be associated with their own unique related target key. In this way there is a need for the ability to store multiple related target keys in a singular location, and as such in block 404 the related target keys are stored in a relationship key table. The relationship key table may simply be a table, comprising a singular column, wherein each row of the column contains a cell which stores a related target key. Each of the corresponding rows within the feature column groups will be assumed to be linked or attributed to the related target key in said row. For example, if all of the data objects associated with account holder "Account Holder A" are in the fifth row of each feature column and feature column group, then the fifth row of the relationship key table would contain the related target key associated with "Account Holder A".

In block 406, the relationship key table is appended to each of the feature column groups, such that any feature column group comprising data objects which have related data objects in other feature column groups would have a relationship key table appended to said feature column group. The relationship key may reside adjacent to the feature column group, such as on the right, left, top, or bottom sides, or in some embodiments the relationship key table may reside completely independent to the feature column groups in a separate or centralized location.

The process ends in some embodiments at block 406, where the predictively structured data is output in one or more formats. The predictively structured data may comprise the feature column groups, feature columns, relationship key table, along with the data objects and related target keys stored therein. The predictively structured data can be output, stored, and/or shared in formats including, but not limited to: pdf, .doc, .docx, .jpeg, .vsd, .xls, .xlsx, .csv, or the like.

Figure 5A:
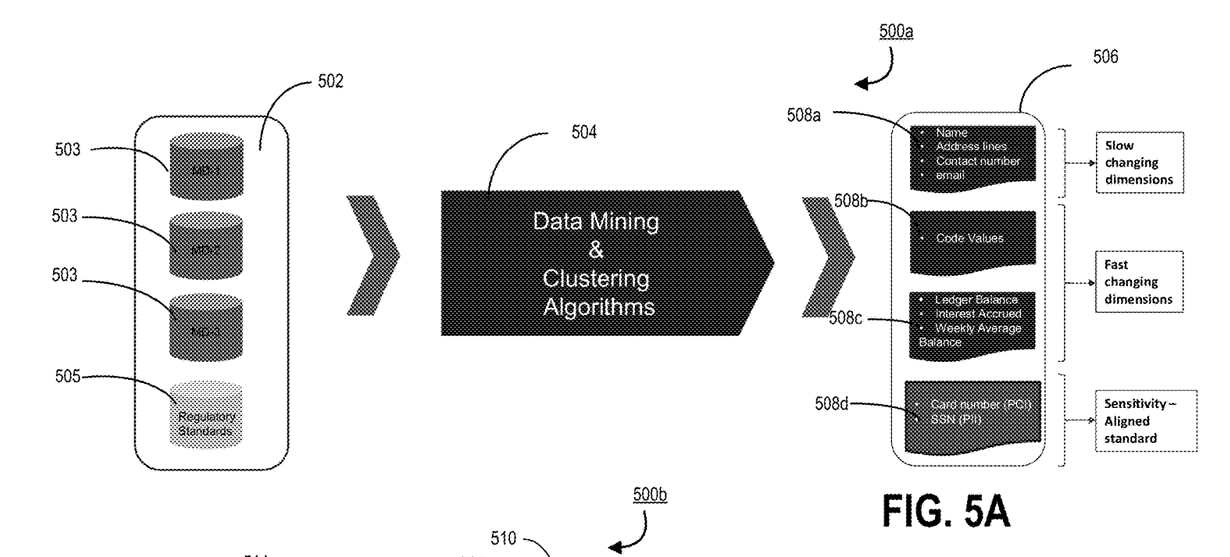
FIG. 5A illustrates a diagram for identifying feature column groups using entity data tables and regulatory data.

FIG. 5A illustrates a diagram 500a for identifying feature column groups using entity data tables and regulatory data. The system receives inputs 502 comprising metadata 503 from data warehouse(s), where the entity data tables are presented as inputs 502 to the system alongside regulatory data 505 which comprises data sensitivity standards. Data mining and classification models 504 are applied to the inputs 502.

The data sensitivity standards are mined from the regulatory data 505, as previously described. Regulatory data 505 are provided by organizations, and typically provided in documents which are either in text format or are capable of being converted to text format by the system. The system mines the data sensitivity standards from regulatory data 505, such as by parsing the document for keywords. Likewise, metadata 503 is mined from entity data tables.

Once the metadata 503 is mined from the entity data tables and the data sensitivity standards are mined from the regulatory data 505, the system uses a classification model such as a K-means algorithm to transform the mined data into a set of column groups 506. The set of feature column groups 506 comprises at least one feature column group, represented graphically herein as feature column groups 508a, 508b, 508c, and 508d. As shown, feature column group 508a comprises name, address, contact number, email. Feature column group 508b comprises 508b comprises code values. Feature column group 508c comprises ledger balance(s), interest accrued, weekly average balances. Feature column group 508d comprises card number and SSN, and as illustrated this feature column group 508d has been identified as being subject to data sensitivity standards as put forth by the regulatory data 505. It shall be noted that the feature column groups 508a, 508b, 508c, and 508d and contents therein are merely non-limiting examples and are not indicative of any required clustering into feature column groups as a result of the classification model.

Figure 5B:
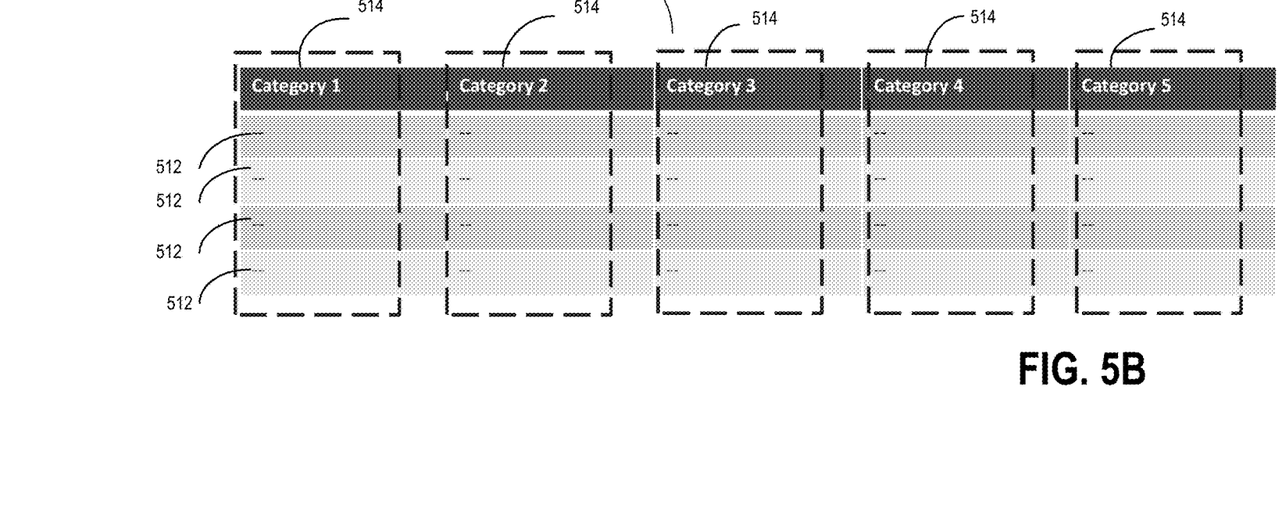
FIG. 5B is a diagram illustrating the identification of feature columns.

FIG. 5B illustrates a diagram 500b illustrating the identification of feature columns. In FIG. 5B, a feature column group 510 is shown, wherein the feature column group 510 comprises feature columns 514. As shown, feature column 514 may be defined by a first category ("Category 1"), while in other locations feature columns 514 may be defined by a second category ("Category 2"), and so forth. In the embodiment shown, data objects 512 will be entered into a cell located within a feature column 514, and the feature column 514 will be identified based on the contents of the data object(s) 512 therein. Most embodiments are such that there is no overlap between feature columns, for example a data object 512 which is located in "Category 1" will not be duplicated in "Category 2", and so forth. However, alternate embodiments are contemplated where duplicate data objects 512 may be entered in multiple feature columns.

Figure 6:
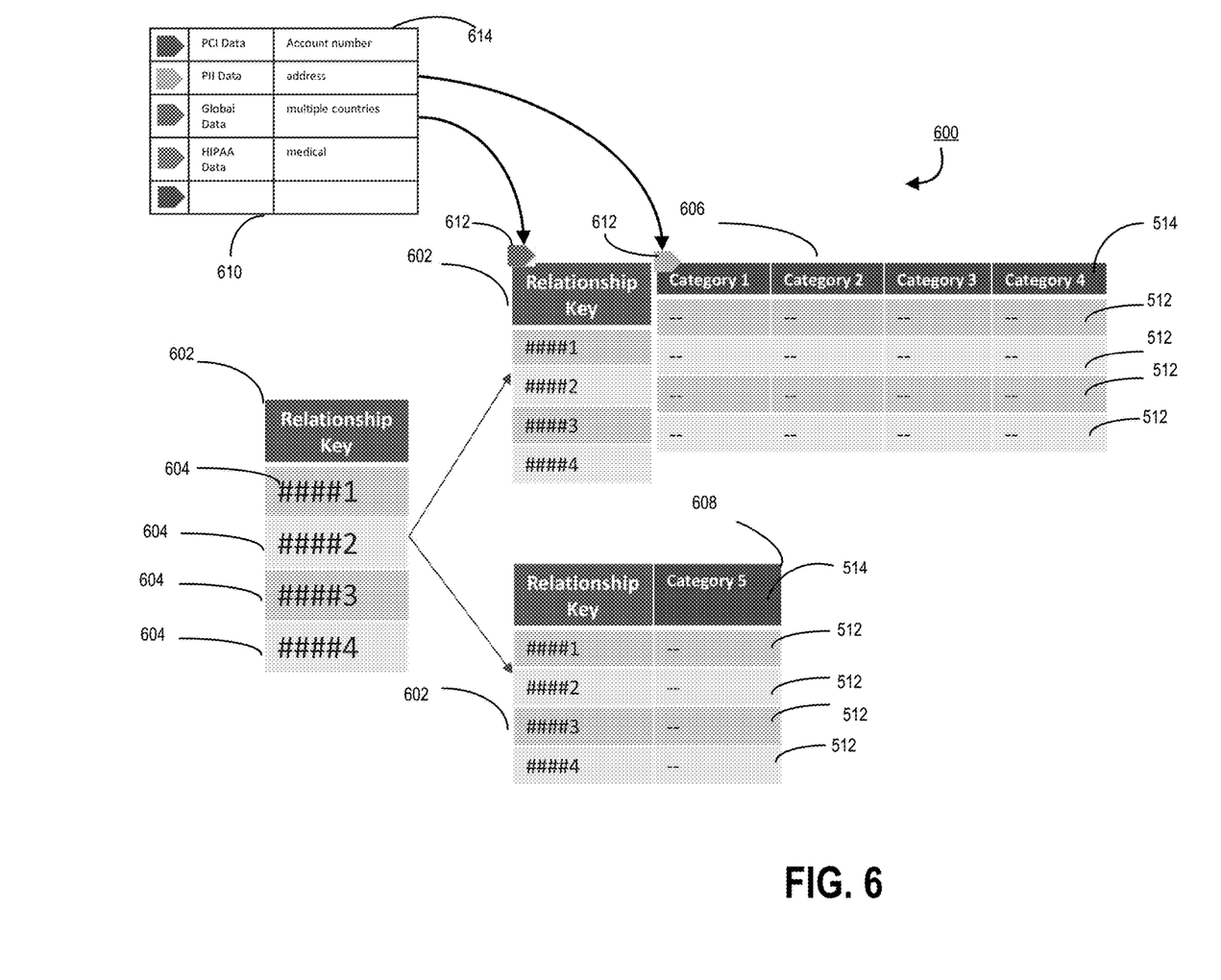
FIG. 6 illustrates a diagram of a relationship key table in conjunction with a feature column group.

FIG. 6 illustrates a diagram 600 of a relationship key table in conjunction with a feature column group 606. The relationship key table 602 comprises a plurality of related target keys 604, wherein the related target keys 604 are created as unique identifiers for relating a singular user or entity's data objects 512 across a plurality of feature columns 514 and/or feature column groups 608. The related target keys 604 are unique such that they will only be used to relate to a user or entity once, and not be used for multiple users or entities. However, the feature target key itself may be duplicated or shown in multiple instances under the circumstances where a user or entity's associated data objects are located on more than one feature column group, such as illustrated by the first feature column group 606 and the second feature column group 608 in FIG. 6.

As seen in FIG. 6, the relationship key table 602 may take identical forms, meaning being comprised of the same related target keys 604, in the same order, across a plurality of feature column groups 606. However, in some embodiments the relationship key table 602 may presented with the related target keys 604 in an alternate order in certain feature column groups 606. In yet additional embodiments, the relationship key table 602 may be unique to a feature column group 606, such that the list of related target keys 604 within the relationship key table 602 for a group is unique for said feature column group 606, whereas the relationship key table 602 for a different feature column group(s) 606 comprises a different order of related target keys 604, or a different group of related target keys 604 altogether.

Furthermore, FIG. 6 illustrates the output of flagging the one or more feature columns or the feature column groups based on data type and sensitivity, as previously described in FIG. 3. A flagging table 610 is provided which illustrates one non-limiting example of various flags 612 as well as flag descriptors 614 associated with each of the flags 612. The system recognizes that, for example, a feature column 514 contains addresses, and as such the feature column 514 is marked or tagged with a flag 612 which is associated with addresses. This flag 612 indicates the appropriate level of sensitivity required for the feature column 514. Similarly, a different flag 612 may be used for a feature column 514 to indicate that the feature column 514 contains a different type of data object such as health information, account numbers, or the like. Flag 612 may also be used to indicate that the entire feature column group 606 contains certain types of data objects.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to data flowchart illustrations and/or block diagrams of systems, methods, and/or computer program products. It will be understood that each block included in the data flowchart illustrations and/or block diagrams, and combinations of blocks included in the data flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the data flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the data flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the data flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for organizing data objects, the system comprising:
    a memory device with computer-readable program code stored thereon;
    a communication device;
    a processing device operatively coupled to the memory device and the communication device, wherein the processing device is configured to execute the computer-readable program code to:
        receive entity data tables, wherein the entity data tables comprise data objects stored in a memory device of an entity system;
        receive regulatory standard documentation comprising data handling guidelines identified from keywords in text of the regulatory standard documentation, wherein the regulatory standard documentation is a pdf file;
        mine metadata from the entity data tables and mine the data handling guidelines from the regulatory standard documentation;
        perform clustering on mined data using a K-means algorithm to determine a common grouping of the mined data to prepare for identification of a feature column group, wherein the mined data comprises the mined data handling guidelines and the mined metadata, and wherein the feature column group comprises one or more feature columns determined by the K-means algorithm to relate to other feature columns within the feature column group based on the metadata and data handling guidelines of the data objects within each of the feature columns;
        import unknown data objects to a cell of a column;
        identify the feature column of the column using a machine learning model trained using training data objects with known feature columns and known feature columns groups;
        identify the feature column group based on data type and sensitivity; and
        improve a confidence interval of the identified feature column of the feature column group by subjecting the data objects to the machine learning model multiple times.

2. The system of claim 1, wherein the processing device is further configured to execute the computer-readable program code to:
    assign a related target key to data objects extending across multiple feature column groups;
    store the related target key in a relationship key table;
    append the relationship key table to each of the feature column groups; and
    output predictively structured data in one or more visual formats.

3. The system of claim 1, wherein performing clustering on the mined entity data tables is performed iteratively.

4. The system of claim 1, wherein the machine learning model further comprises classifying and identifying the data objects or the one or more feature columns as numeric or non-numeric, and wherein a Naïve Bayes algorithm is used for non-numeric, and a decision tree algorithm is used for numeric.

5. The system of claim 1, wherein identifying the feature column comprises determining a name of the feature column.

6. The system of claim 1, wherein the processing device is further configured to execute the computer-readable program code to:
    flag the feature column group based on the data type and the sensitivity.

7. The system of claim 1, wherein the processing device is further configured to execute the computer-readable program code to:
    flag the feature column based on the data type and the sensitivity.

8. A computer program product for organizing data objects, the computer program product comprising at least one non-transitory computer-readable medium having computer-readable program code portions embodied therein, the computer-readable program code portions comprising:
    receiving entity data tables, wherein the entity data tables comprise data objects stored in a memory device of an entity system;
    receiving regulatory standard documentation comprising data handling guidelines in text identified from keywords in text of the regulatory standard documentation, wherein the regulatory standard documentation is a pdf file;
    mining metadata from the entity data tables and mining the data handling guidelines from the regulatory standard documentation;
    performing clustering on mined data using a K-means algorithm to determine a common grouping of the mined data to prepare for identification of a feature column group, wherein the mined data comprises the mined data handling guidelines and the mined metadata, and wherein the feature column group comprises one or more feature columns determined by the K-means algorithm to relate to other feature columns within the feature column group based on the metadata and data handling guidelines of the data objects within each of the feature columns;
    importing unknown data objects to a cell of a column;
    identifying the feature column of the column using a machine learning model trained using training data objects with known feature columns and known feature columns groups;

identifying the feature column group based on data type and sensitivity; and improving a confidence interval of the identified feature column of the feature column group by subjecting the data objects to the machine learning model multiple times.

9. The computer program product of claim 8, the computer-readable program code portion further comprising:

assigning a related target key to data objects extending across multiple feature column groups;

storing the related target key in a relationship key table;

appending the relationship key table to each of the feature column groups; and outputting predictively structured data in one or more visual formats.

10. The computer program product of claim 8, wherein performing clustering on the mined entity data tables is performed iteratively.

11. The computer program product of claim 8, wherein the machine learning model further comprises classifying and identifying the data objects or the one or more feature columns as numeric or non-numeric, and wherein a Naïve Bayes algorithm is used for non-numeric, and a decision tree algorithm is used for numeric.

12. A computer-implemented method for organizing data objects, the method comprising:

providing a computing system comprising a computer processing device and a non-transitory computer readable medium, where the non-transitory computer readable medium comprises configured computer program instruction code, such that when said computer program instruction code is operated by said computer processing device, said computer processing device performs the following operations:

receiving entity data tables, wherein the entity data tables comprise data objects stored in a memory device of an entity system;

receiving regulatory standard documentation comprising data handling guidelines in text identified from keywords in text of the regulatory standard documentation, wherein the regulatory standard documentation is a pdf file;

mining metadata from the entity data tables and mining the data handling guidelines from the regulatory standard documentation;

performing clustering on mined data using a K-means algorithm to determine a common grouping of the mined data to prepare for identification of a feature column group, wherein the mined data comprises the mined data handling guidelines and the mined metadata, and wherein the feature column group comprises one or more feature columns determined by the K-means algorithm to relate to other feature columns within the feature column group based on the metadata and data handling guidelines of the data objects within each of the feature columns;

importing unknown data objects to a cell of a column;

identifying the feature column of the column using a machine learning model trained using training data objects with known feature columns and known feature columns groups;

identifying the feature column group based on data type and sensitivity; and improving a confidence interval of the identified feature column of the feature column group by subjecting the data objects to the machine learning model multiple times.

13. The computer-implemented method of claim 12, wherein the operations of the computer processing device further comprise:

assigning a related target key to data objects extending across multiple feature column groups;

storing the related target key in a relationship key table;

appending the relationship key table to each of the feature column groups; and outputting predictively structured data in one or more visual formats.

14. The computer-implemented method of claim 12, wherein performing clustering on the mined entity data tables is performed iteratively.

15. The computer-implemented method of claim 12, wherein the machine learning model further comprises classifying and identifying the data objects or the one or more feature columns as numeric or non-numeric, and wherein a Naïve Bayes algorithm is used for non-numeric, and a decision tree algorithm is used for numeric.

* * * * *